Sept. 8, 1936.    A. A. WIEDMAIER    2,053,929

POWER TRANSMISSION MECHANISM

Filed Sept. 20, 1934

INVENTOR
Arthur A.
Wiedmaier.
ATTORNEY.

Patented Sept. 8, 1936

2,053,929

UNITED STATES PATENT OFFICE 2,053,929

POWER TRANSMISSION MECHANISM

Arthur A. Wiedmaier, Cleveland, Ohio, assignor to Wiedmaier, Inc., Wilmington, Del., a corporation of Delaware Application September 20, 1934, Serial No. 744,822

11 Claims. (Cl. 74—314)

This invention relates to power transmission mechanisms, and particularly to multi-speed transmission mechanisms for the driving axles of automobiles.

Among the objects of the invention are:

To provide an improved power transmission mechanism for the driving axles of automotive vehicles;

To provide an improved transmission of the type comprising a differential mechanism and speed change mechanism;

To provide an improved transmission mechanism for automobile driving axles of the planetary gearing type for transmitting power to the axle at two different speeds, and in which the planetary movement may provide the higher speed;

To provide a combined differential and planetary two-speed transmission mechanism for automobile driving shafts, the parts of which may be assembled together in the minimum of space;

To provide, for axle drive transmission mechanisms of the class referred to, improved means for lubricating the working parts thereof.

Other objects will be apparent to those skilled in the art to which my invention appertains.

My invention is fully disclosed in the following description taken in connection with the accompanying drawing in which.

Figure 1:
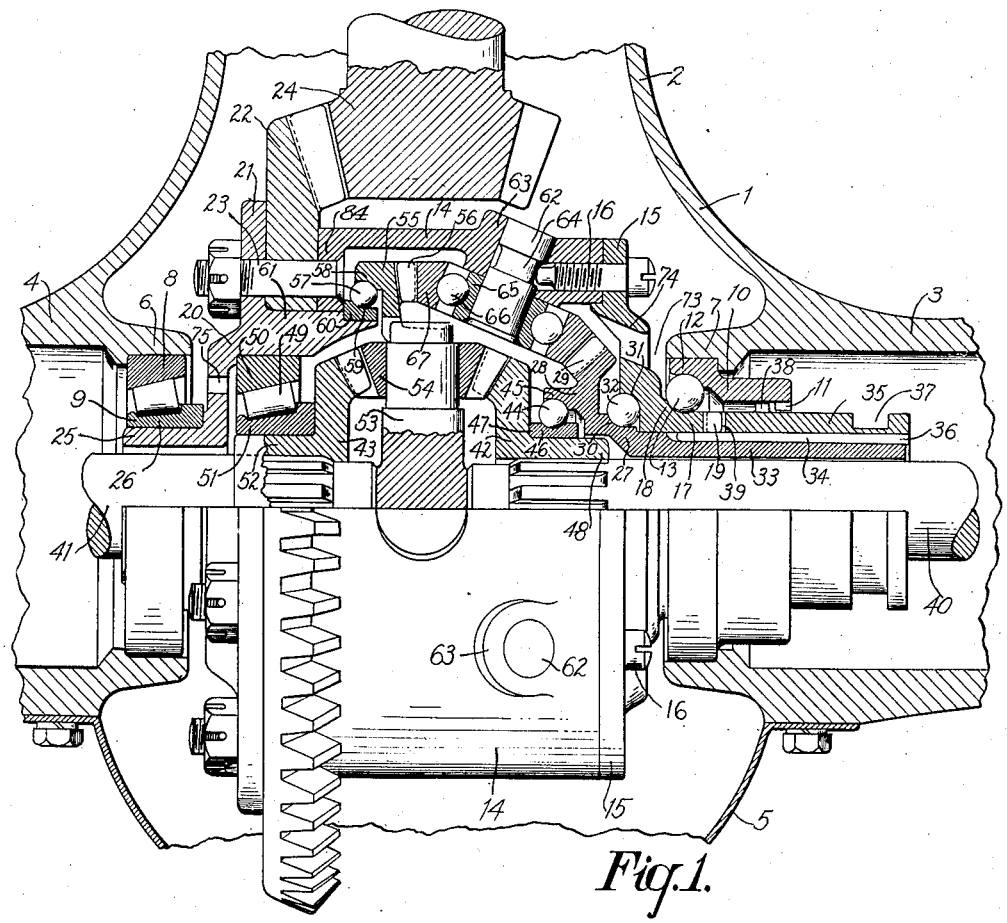
Fig. 1 is a view partly in elevation and partly in section of a mechanism embodying my invention in a preferred form as applied to the differentially driven axles of an automotive vehicle, the sectional plane being in general horizontal.

Referring to the drawing, I have shown at 1 an axle housing having a forwardly projecting tubular portion 2 which, by means of parts broken away, may be secured to the propeller shaft housing of the vehicle. At 3 and 4 are tubular lateral extensions which by portions thereof broken away in the drawing may unite with other housing portions to entirely enclose the driving axles and bearings therefor. The rearward side of the housing 1 is open and is covered by a removable cover of sheet metal or the like 5.

The housing has axially aligned and axially spaced inwardly projecting tubular bases 6 and 7; and into the bored inner wall of the tubular base 6 is press-fitted the outer raceway 8 of a roller bearing, the inner tubular raceway of which is shown at 9. The tubular base 7 has rigidly press-fitted into a bore thereof a sleeve 10 having at its axially outer end a circular series of teeth 11, only one of which is shown, and on the more inwardly disposed part has formed the outer raceway 12 of a ball bearing comprising balls 13.

A housing structure now to be described is rotatably supported at axially opposite portions in the bearing just described. The housing comprises an intermediate generally cylindrical portion 14 having an end plate 15 rigidly secured thereto by a series of bolts or screws 16. The end plate 15 has an axially extending generally tubular extension 17 thereon upon which is formed the inner raceway 18 for the balls 13. On the extreme outer end of the tubular extension 17 is a circular series of teeth 19 only one of which is shown. At the opposite end of the housing portion 14 is a clamp plate 20 having an annular flange 21 between which and the housing portion 14 is clamped a ring gear 22, clamping bolts 23 being projected through the flange 21 and ring gear 22, and through a radially inwardly extending flange 84 on the housing portion 14.

The ring gear 22 may be of the usual ring gear construction as ordinarily associated with a differential gear mechanism, and may mesh with a pinion 24 driven by the propeller shaft.

The clamp plate 20 has an outwardly axially extending tubular extension 25 upon which is press-fitted the inner raceway element 26 corresponding to the outer raceway element 8 above referred to.

The clamp plate 20, ring gear 22, intermediate cylindrical portion 14, and the end plate 15 of the housing thus provided may rotate on the axially spaced bearings just described.

At 27 is a sun gear element having an annular portion 28 disposed inwardly of and adjacent to the end plate 15 and having on its outer periphery bevel gear teeth 29. A raceway 30 on the sun gear element 27, a corresponding raceway 31 on the end plate 15, and balls 32 therebetween rotatably support the sun gear. A tubular extension 33 on the sun gear element 27 extends outwardly axially therefrom and has longitudinal splines 34 formed on its outer tubular surface.

A tubular clutch element 35 has inner longitudinal splines 36 thereon meshed with the splines 34 of the sun gear element, is provided with an annular groove 37 by which it may be shifted longitudinally on the splines, by any suitable shifting fork not shown but well known in the art, and has an outer annular series of teeth 38 only one of which is shown and on its axially inner end an annular series of teeth 39 only one of which is shown. When the clutch element 35 is shifted axially as described, in the outer direction it will engage the teeth 38 thereon with the stationary teeth 11 connected to the main frame 1 through the extension 10, and when shifted in the other direction may engage the teeth 39 with the teeth 19 on the housing end plate 15, and since the clutch element 35 is splined upon the sun gear 27, these respective operations will in the first case lock the sun gear against rotation to the frame 1, and in the second case will lock the sun gear to the housing end 15 and therefore to the ring gear 22 rigidly secured thereto.

The axles 40 and 41, axially disposed, are spline fitted at their opposite inner ends into corresponding splined bores in differential gears 42 and 43, the gear 42 and inner end of the axle being rotatably supported by ball bearings 44 having a raceway 45 on the sun gear element 27 and a raceway 46 on a raceway element 47 press-fitted on the hub portion 48 of the differential gear 42; and the differential gear 43 is rotatably supported on the housing clamp plate 20 by bearing rollers 49, a raceway element 50 press-fitted into a bore in the clamp plate 20 and a raceway element 51 press-fitted on a hub 52 of the bevel gear 43.

A differential spider 53 rotatably supports a plurality of bevel pinions 54, only one of which is shown, meshed with the bevel gears 42 and 43 in the usual manner of differential gear constructions. On the outer peripheral portion of the spider 53 is mounted an orbit gear 55 having an annular series of bevel teeth 56. The orbit gear 55 is mounted to rotate on a ball bearing comprising an annular series of balls 57, a raceway 58 on the orbit gear 55, and a raceway 59 on a corresponding raceway element 60 press-fitted on an inwardly projecting tubular extension 61 of the clamp plate 20. By this bearing construction the orbit gear 55 moves at all times in unison with the spider 53 and may have rotational bearing support on the housing.

A plurality, such as three, stub shafts 62—62 are projected inwardly through the wall of the housing 14, the housing wall being thickened as at 63 to support the stub shafts, and the shafts are retained in position by an annular groove 64 in the shafts engaged by the inner end of the screw 16. On the inner end of the stub shaft 62 a bearing raceway element 65 is press-fitted and balls 66 are provided running in the raceway thereof, and the bevel gear 67 having a suitable cooperating raceway is rotatably supported on the shaft 62 by the balls 66. Each of the bevel gears 67, only one of which is shown, mesh their teeth with the teeth 56 of the orbit gear 55 and with the teeth 29 of the sun gear element 27, the gears 67 being the planet gears of the planetary gearing comprising the orbit gear 55 and sun gear 27.

In the operation of the transmission above described, power from the engine rotates the pinion gear 24 and the ring gear 22, the latter rotating the housing comprising the clamp plate 20, housing portion 14, and end plate 15. With the clutch element 35 shifted to its left-hand position illustrated, locking the sun gear 27 to the housing end plate 15, the sun gear 27 is thereby prevented from rotating relative to the housing and therefore relative to the ring gear 22, and the planet gears 67 being locked to the sun gear, and the orbit gear 55 being locked to the planet gear by their mutually engaged teeth, the orbit 55 will rotate in unison with the ring gear 22; and the differential spider 53 secured to the orbit gear 55 will likewise rotate in unison with the ring gear 22 and transmit power to the axles differentially in a manner that will be understood, at a speed ratio of one to one as between the ring gear 22 and the axles 40 and 41.

When the clutch element 35 is shifted to its righthand position, as viewed in the drawing, it will lock the sun gear 27 to the frame 1, holding the sun gear stationary. The planet gears 67 moving with the housing and ring gear 22 will be rotated by their tooth engagement with the sun gear 27 and will in turn rotate the orbit gear 55 by their toothed engagement therewith whereby the orbit gear 55 will rotate at a higher speed than the ring gear 22 and will correspondingly rotate the spider 53 and the shafts 40 and 41 at a greater than one to one ratio.

It will be observed that all of the gears except the ring gear are enclosed within the housing composed of the clamp plate 20, cylindrical portion 14, and end plate 15, and in order that the same may be thoroughly lubricated I provide the following lubricating means.

In an upper portion of the housing 1 I secure a trough-like device 68, which may conveniently be made from sheet metal, and comprising edge portions 69 and 70 disposed adjacent the periphery of the ring gear 22 and comprising a downwardly inclined trough or conveyor 71, the lower end of which is bent sharply downwardly as at 72.

As is common with transmissions employing a ring gear, as above described, a quantity of lubricant is provided in the lower portion of the housing 1 through which the lower peripheral portions of the ring gear 22 may sweep to pick up lubricant to lubricate the teeth of the ring gear and of the pinion 24. Such a supply of lubricant is employed in the practice of my invention, and lubricant adhering to the ring gear 22 will be elevated thereby and will be scraped off by the edges 69 and 70 above described, the lubricant thus scraped off being discharged into the trough 71 and flowing downwardly therethrough by gravity and being discharged from the end 72 thereof.

Figure 2:
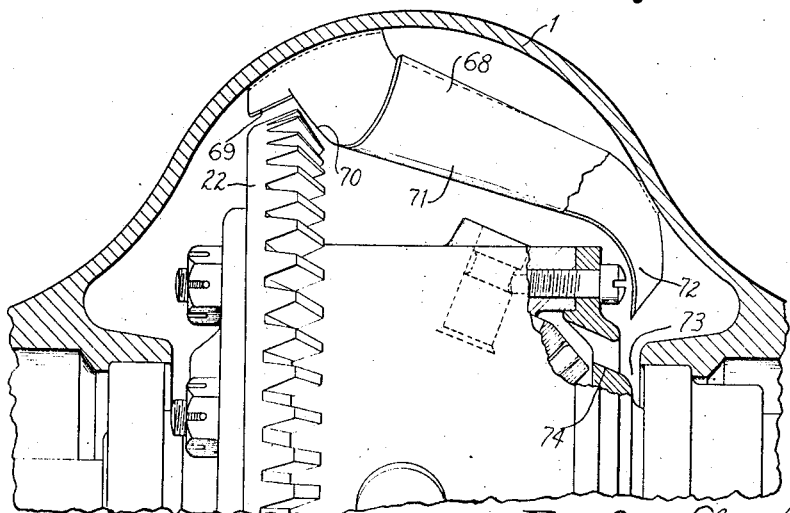
Fig. 2 is a fragmentary view of the embodiment of Fig. 1 with some of the parts in cross-section on a generally vertical plane.

As shown both in Figs. 1 and 2, the end plate 15 is spaced slightly axially from the inner end of the tubular base 7 of the housing, as at 73, and communicating with this space 73 and with the interior of the housing is provided a plurality of inwardly upwardly inclined passageways 74, only one of which is shown. Lubricant flowing from the end 72 of the trough device 68 will drop by gravity into the space 73 and will flow thence into the passageways 74, and due to the inclined formation thereof, centrifugal force will act upon the lubricant and propel it through the passageways 74 into the housing with a centrifugal pumping action.

A continual stream of lubricant is thus fed or pumped into the housing and will fill the same. If desired, the lubricant thus pumped into the housing may be caused to flow therethrough and thus continually circulate through the system. This may be accomplished by providing, as at 75, one or more perforations establishing communication from the interior of the housing outwardly to the interior of the housing 1 in which the supply of lubricant is contained. Thus lubricant pumped in at the passageways 74 under the pressure created by the centrifugal force will fill the housing and then flow out through the openings 75 and thus continually renew the lubricant in the housing.

My invention is not limited to the exact details of construction shown and described. Many modifications and changes may be made within the spirit of my invention and the scope of the appended claims.

I claim:

1. In a multi-speed transmission mechanism for driving the axle of an engine driven vehicle, a rotary driven element connected to the axle for driving it, a rotary bevel orbit gear for rotatively driving the driven element, a ring gear for receiving power from the engine, the ring gear being provided with an annular axially extending flange, anti-friction elements between said flange and the orbit gear maintaining the orbit gear axially spaced from radially extending portions of the ring gear whereby axial and radial thrusts of the orbit gear are transmitted to the ring gear by said elements, a rotary bevel sun gear, a plurality of rotary bevel planet gears, constantly meshed with the orbit and sun gears, rotary bearing supports for the planet gears connected to and rotatable in unison with the ring gear, a speed changing element movable selectively to one position to effect connection of the sun gear to a non-rotative portion of the vehicle, to cause the ring gear to drive the orbit gear and the driven element at a high speed, and movable to another position to effect connection of the sun gear to the ring gear to cause the ring gear to drive the orbit gear and driven element in unison with the ring gear, at a low speed.

2. In a multi-speed transmission mechanism for differentially driving the axles of an engine driven vehicle, a differential gearing connecting the axles comprising a rotary spider element, a rotatable bevel orbit gear for rotatively driving the spider element, a rotary ring gear for receiving power from the engine, the ring gear being provided with an annular axially extending flange, anti-friction elements between said flange and the orbit gear whereby the orbit gear is rotatably supported on said flange and maintained axially spaced from radially extending portions of the ring gear, a rotary bevel sun gear, a plurality of rotary bevel planet gears constantly meshed with the orbit and sun gears, the planet gears maintaining the orbit gear in engagement with said anti-friction elements, rotary bearing supports for the planet gears, connected to and rotatable in unison with the ring gear, a speed changing element movable selectively to one position to effect connection of the sun gear to a non-rotative portion of the vehicle, to cause the ring gear to drive the orbit gear and spider element at a high speed, and movable to another position to effect connection of the sun gear to the ring gear to cause the ring gear to drive the orbit gear and spider element in unison with the ring gear, at a low speed.

3. In a multi-speed mechanism for differentially driving the axles of an engine driven vehicle, differential gearing connecting the axles comprising a spider element, a rotary bevel orbit gear for rotatively driving the spider element, a ring gear for receiving power from the engine, a walled housing secured to the ring gear and rotatable therewith and enclosing the orbit gear, the ring gear being provided with an annular axially extending flange, anti-friction elements between said flange and the orbit gear whereby the orbit gear is rotatably supported on the flange and maintained spaced from radially extending portions of the housing, a rotary bevel sun gear in the housing, a plurality of rotary bevel planet gears in the housing constantly meshed with the orbit and sun gears, bearing supports for the planet gears secured to a wall of the housing, a speed changing element movable selectively to one position to effect connection of the sun gear to a non-rotative portion of the vehicle, to cause the ring gear to drive the orbit gear and spider element at a high speed, and movable to another position to effect connection of the sun gear to the ring gear to cause the ring gear to drive the orbit gear and the spider element in unison with the ring gear, at a low speed.

4. In a multi-speed mechanism for driving the axle of an engine driven vehicle, an axle driving element, a rotary bevel orbit gear for rotatively driving the driving element, a ring gear for receiving power from the engine, a walled housing secured to the ring gear rotatable therewith and enclosing the orbit gear, the ring gear being provided with an annular axially extending flange, anti-friction elements between the flange and the orbit gear whereby the orbit gear is rotatably supported on the flange and maintained spaced from radially extending portions of the housing, a rotary bevel sun gear in the housing, a plurality of rotary bevel planet gears in the housing constantly meshed with the orbit and sun gears, bearing supports for the planet gears secured to a wall of the housing, a speed changing element movable selectively to one position to effect connection of the sun gear to a non-rotative portion of the vehicle to cause the ring gear to drive the orbit gear and driven element at a high speed, and movable to another position to effect connection of the sun gear to the ring gear to cause the ring gear to drive the orbit gear and driven element in unison with the ring gear, at a low speed.

5. In a multi-speed transmission for differentially driving the axles of an engine driven vehicle, differential gearing connecting the axles comprising a rotary spider element, a ring gear for receiving power from the engine, and disposed generally at one side of the spider element, a bevel orbit gear for rotatively driving the spider element and having a rotary bearing support on the ring gear, said support comprising an annular axially extending flange on the ring gear and anti-friction elements between said flange and the orbit gear whereby the orbit gear is maintained spaced from radially extending portions of the ring gear, a rotary bevel sun gear axially spaced from the orbit gear and generally on the other side of the differential gearing, and rotatable in a plane substantially parallel to the plane of the orbit gear, a plurality of rotary bevel planet gears constantly meshed with the orbit and sun gears, and connected to and rotatable in unison with the ring gear, and each rotatable in a plane at an angle to the rotational planes of the orbit and sun gears, a speed changing element movable selectively to one position to effect connection of the sun gear to a non-rotative portion of the vehicle, to cause the ring gear to drive the orbit gear and spider element at a high speed, and movable to another position to effect connection of the sun gear to the ring gear to cause the ring gear to drive the orbit gear and spider element in unison with the ring gear, at a lower speed.

6. In a multi-speed transmission mechanism for differentially driving the axles of an engine driven vehicle, a housing having coaxial hub portions journaled on fixed portions of the vehicle, a gear fixed to the housing engageable with the engine propeller shaft for effecting rotation of the housing, the axles being projected through the hub portions into the housing, differential gearing connecting the axles comprising a rotary spider element affording a mounting for planetary gears of the differential gearing, speed changing mechanism interconnecting the housing and the differential gearing comprising a first gear secured to the rotary spider element, and rotatably supported by the housing, said support comprising an axially extending annular portion provided on the housing and anti-friction elements engaging said annular portion and the first gear maintaining said first gear axially spaced from radially extending portions of the housing, a second gear rotatably supported by the housing and continuously engageable with the first gear, and means whereby the second gear may be selectively locked against rotation about its axis to cause the spider element to rotate at the same speed as the housing or to cause said second gear to rotate about its axis to effect an increase in rotational speed of the spider relative to the housing.

7. In a multi-speed transmission mechanism for differentially driving the axles of an engine driven vehicle, a housing having coaxial hub portions journaled on fixed portions of the vehicle, a ring gear fixed to the housing and adapted to receive power from the engine for effecting rotation of the housing, differential gearing disposed within the housing connecting the axles and comprising a rotary spider element, speed changing mechanism interconnecting the housing and the differential gearing comprising a first gear secured to the rotary spider element coaxial therewith and rotatably supported by the housing, said rotatable support comprising an axially extending annular flange provided on the housing and anti-friction elements between said flange and the first gear maintaining the first gear out of contact with radially extending housing portions, a second gear rotatably supported by the housing and continuously engageable with the first gear, and means comprising an element movable axially of the vehicle axle and selectively engageable with the housing and fixed portions of the vehicle whereby when the said element is engaged with the housing the second gear is prevented from rotating relative to the housing to cause the differential gearing to rotate at the same speed as the housing and when said element is engaged with the fixed portions of the vehicle the said second gear is caused to rotate relative to the housing to effect increased rotation of the differential gearing.

8. In a multi-speed transmission mechanism for differentially driving the axles of an engine driven vehicle, a rotatable housing operably connected to the engine and adapted to have the vehicle axles projected thereinto, differential gearing connecting the axles comprising a rotary spider element affording a mounting for the planetary gears of the differential gearing, speed changing mechanism interconnecting the housing and the differential gearing comprising a first gear means secured to the rotary spider element and rotatably supported by the housing, said rotatable support comprising an axially extending annular flange provided on the housing and anti-friction elements between said flange and the first gear maintaining the first gear out of contact with radially extending housing portions, a second gear means rotatably supported by the housing and continuously engageable with the first gear means, and a third gear means continuously engageable with the second gear means, the third gear means being adapted to be selectively locked with the housing or fixed portions of the vehicle whereby the differential gearing will be caused to rotate at the same speed as the housing when the third gear means is locked with the housing and will be caused to rotate at a relatively increased speed when the third gear means is locked with fixed portions of the vehicle.

9. In a multi-speed transmission mechanism for differentially driving the axles of an engine driven vehicle, a frame having coaxial hub portions journaled on fixed portions of the vehicle, a gear fixed to the frame engageable with the engine propeller shaft for effecting rotation of the frame and constituting with the frame a rotary unit, the axles being projected through the hub portions into the frame, differential gearing connecting the axles comprising a rotary spider element affording a mounting for planetary gears of the differential gearing, speed changing mechanism interconnecting the unit and the differential gearing comprising a first gear secured to the rotary spider element and rotatively supported by the unit, said support comprising an annular portion provided on the unit intermediately of the hub portions thereof and anti-friction elements engaging said annular portion and the first gear maintaining said first gear axially spaced from radially extending portions of the unit, a second gear rotatively supported by the frame and continuously engageable with the first gear, and means whereby the second gear may be selectively locked against rotation about its axis to cause the spider element to rotate at the same speed as the unit or to cause said second gear to rotate about its axis to effect an increase in rotational speed of the spider relative to the unit.

10. In a multi-speed transmission mechanism for differentially driving the axles of an engine driven vehicle, a frame having coaxial hub portions journaled on fixed portions of the vehicle, a ring gear fixed to the frame adapted to receive power from the engine for effecting rotation of the frame and constituting with the frame a rotary unit, differential gearing disposed within the frame connecting the axles and comprising a rotary spider element, speed changing mechanism interconnecting the unit and the differential gearing comprising a first gear secured to the rotary spider element coaxial therewith and rotatably supported by the housing, said rotatable support comprising an annular portion provided on the unit intermediate of the hub portions thereof and anti-friction elements between said annular portion and the first gear maintaining said first gear out of contact with radially extending portions of the unit, a second gear rotatably supported by the frame and continuously engageable with the first gear, and means comprising an element movable axially of the vehicle axle and selectively engageable with the frame and fixed portions of the vehicle whereby when the said element is engaged with the frame the second gear is prevented from rotating relative to the frame to cause the differential gearing to rotate at the same speed as the frame and when said element is engaged with the fixed portions of the vehicle the said second gear is caused to rotate relative to the frame to effect increased rotation of the differential gearing.

11. In a multi-speed transmission mechanism for differentially driving the axles of an engine driven vehicle, a rotatable frame operably connected to the engine and adapted to have the vehicle axles projected thereinto, differential gearing connecting the axles comprising a rotary spider element affording a mounting for the planetary gears of the differential gearing, speed changing mechanism interconnecting the frame and the differential gearing comprising a first gear means secured to the rotary spider element and rotatably supported by the frame, said rotatable support comprising an axially extending annular portion on the frame and anti-friction elements between said annular portion and the first gear maintaining the first gear out of contact with radially extending portions of the frame, a second gear means rotatably supported by the frame and continuously engageable with the first gear means, and a third gear continuously engageable with the second gear means, the third gear means being adapted to be selectively locked with the frame or fixed portions of the vehicle whereby the differential gearing will be caused to rotate at the same speed as the frame when the third gear means is locked with the frame and will be caused to rotate at a relatively increased speed when the third gear means is locked with fixed portions of the vehicle.

ARTHUR A. WIEDMAIER.